(12) United States Patent
Nagasawa et al.

(10) Patent No.: US 8,970,451 B2
(45) Date of Patent: Mar. 3, 2015

(54) VISUAL GUIDANCE SYSTEM

(71) Applicant: Fuji Jukogyo Kabushiki Kaisha, Tokyo (JP)

(72) Inventors: Isamu Nagasawa, Tokyo (JP); Noriyoshi Matsuo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/034,829

(22) Filed: Sep. 24, 2013

(65) Prior Publication Data

US 2014/0092134 A1 Apr. 3, 2014

(30) Foreign Application Priority Data

Sep. 28, 2012 (JP) ................................. 2012-217938

(51) Int. Cl.
*G09G 5/00* (2006.01)
*G06F 17/10* (2006.01)
*H04N 7/18* (2006.01)
*G06T 19/00* (2011.01)
*B60K 35/00* (2006.01)
*B60R 1/00* (2006.01)
*G02B 27/00* (2006.01)
*G06F 3/00* (2006.01)

(52) U.S. Cl.
CPC ............... *G06T 19/006* (2013.01); *B60K 35/00* (2013.01); *B60R 1/00* (2013.01); *G02B 27/00* (2013.01); *G06F 3/00* (2013.01); *B60R 2300/107* (2013.01); *B60R 2300/301* (2013.01); *B60R 2300/302* (2013.01); *B60R 2300/308* (2013.01)
USPC .............................. 345/7; 701/301; 348/115

(58) Field of Classification Search
CPC .. G01S 2013/9342; G08G 1/16; G08G 5/045; B60W 10/20; B60W 2050/143; B60W 2050/146; B60K 2350/2013; G01C 21/365; B60Q 9/008; Y10S 367/909; B60T 2201/02
See application file for complete search history.

(56) References Cited

U.S. PATENT DOCUMENTS 8,521,411 B2 8/2013 Grabowski et al.
8,547,298 B2 * 10/2013 Szczerba et al. .................. 345/7
2006/0097858 A1 * 5/2006 Kumabe et al. ............... 340/435
(Continued)

FOREIGN PATENT DOCUMENTS

JP 09-034352 A 2/1997
JP 2004-117294 A 4/2004
(Continued)

*Primary Examiner* — Mark Zimmerman
*Assistant Examiner* — Nurun N Flora
(74) *Attorney, Agent, or Firm* — Mcginn IP Law Group, PLLC

(57) ABSTRACT

A visual guidance system includes an image display to present an image overlaid on a windshield in front of a driver of a vehicle, a processor to output image information on a virtual line to display visual guidance to the image display, and a steering input detector to detect a steering input. The processor presents an attention attracting indication about an object outside of the vehicle in synchronization with the virtual line in such a manner that the virtual line extends from above the driver along a course of the vehicle seen within the windshield, and a pointing end of the virtual line is overlaid on a road surface on the course seen within the windshield. The processor outputs image information for changing the attention attracting indication to be less conspicuous than the virtual line in accordance with a steering input signal given by the steering input detector.

12 Claims, 7 Drawing Sheets

(56) References Cited

U.S. PATENT DOCUMENTS

| | | |
|---|---|---|
| 2007/0067089 A1* | 3/2007 | Yoshida .......................... 701/96 |
| 2009/0005961 A1 | 1/2009 | Grabowski et al. |
| 2009/0306852 A1* | 12/2009 | Ikeda et al. .................... 701/36 |
| 2012/0226392 A1* | 9/2012 | Kataoka ........................... 701/1 |

FOREIGN PATENT DOCUMENTS

| | | |
|---|---|---|
| JP | 2008-501956 A | 1/2008 |
| WO | WO 2005/121707 A2 | 12/2005 |
| WO | WO 2005/121707 A3 | 12/2005 |

* cited by examiner

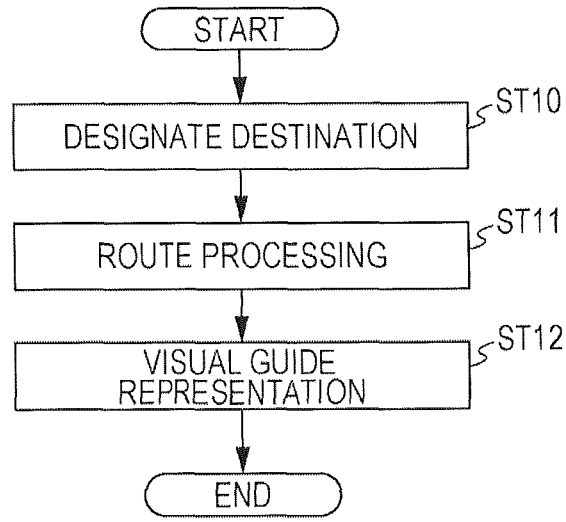
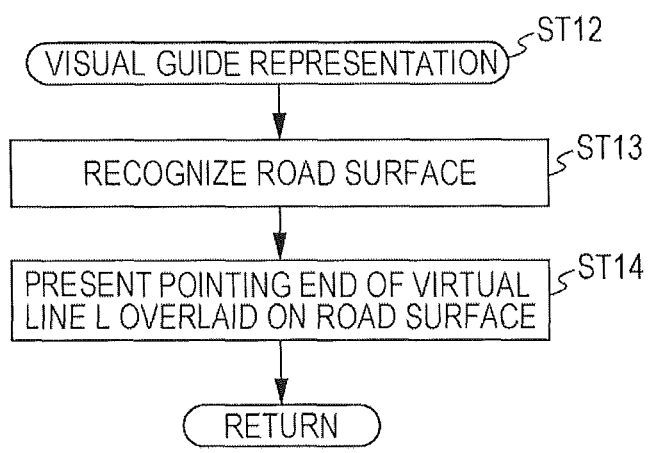

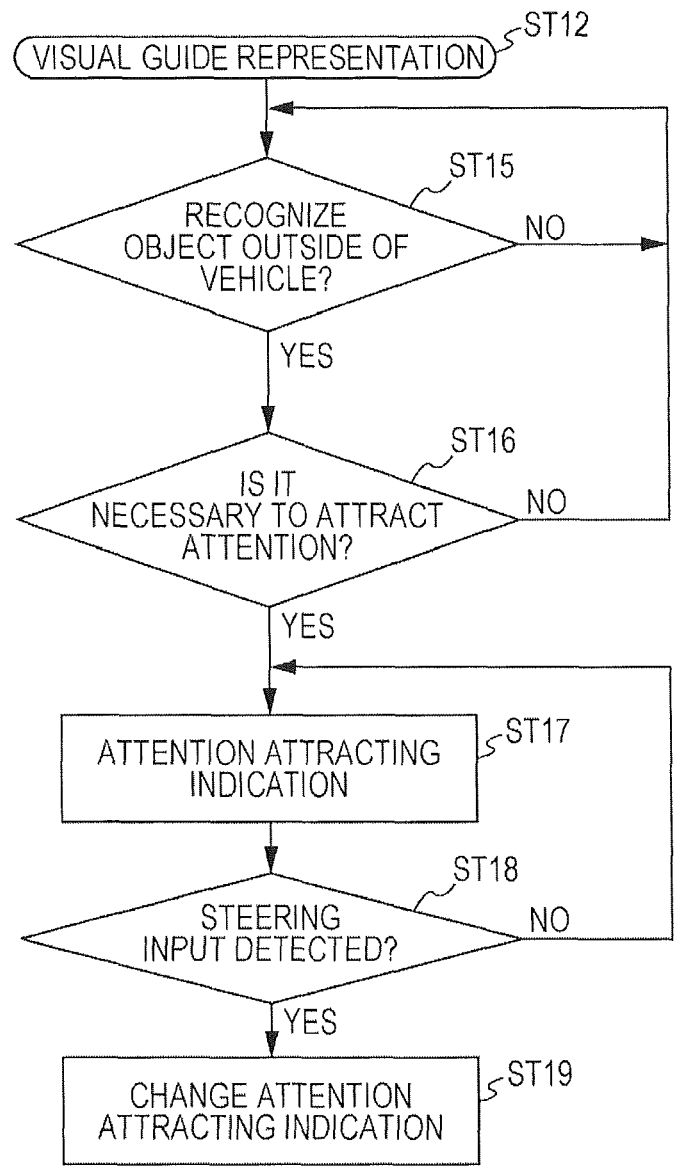

VISUAL GUIDANCE SYSTEM

CROSS-REFERENCE TO RELATED APPLICATIONS

The present application claims priority from Japanese Patent Application No. 2012-217938 filed on Sep. 28, 2012, the entire contents of which are hereby incorporated by reference.

BACKGROUND

1. Field of the Invention

The present invention relates to a visual guidance system for guiding a gaze of a driver of a vehicle such as an automobile.

2. Related Art

Currently, a car navigation system showing a route to a destination to a driver is widely used in a vehicle such as an automobile. In general, the car navigation system uses a display installed on a dashboard to show road guidance.

In Japanese Unexamined Patent Application Publication (Translation of PCT Application) (JP-T) No. 2008-501956, an image of a cable is presented to indicate a route that the vehicle should follow over an actual road that is seen from a driver's seat.

In Japanese Unexamined Patent Application Publication (JP-A) No. 2004-117294, a mark corresponding to a route is presented in a three-dimensional display in the air over a road corresponding to the route.

In JP-A No. 9-34352, a graphic for guidance is changed in accordance with a distance between the vehicle and a guiding point.

However, even if various kinds of car navigation systems such as described above are used, a burden imposed on the driver is heavy.

For example, in a typical car navigation system, a guidance route is not presented in association with an actual road that is seen from the driver's seat, and is presented separately from the actual road. In this case, the driver has to recognize a course on the basis of a route represented by a route indication, associate the recognized course and a real road, identify the road that the driver has to enter from among real roads on the basis of the correspondence therebetween, and perform a driving operation. It takes some time from when the route is presented to when the driver performs a driving operation by identifying the road that the driver should enter.

On the driving route of the vehicle and around the vehicle, there are pedestrians, bicycles, other vehicles, obstacles, and the like. While the driver finds the route on the basis of the indication by the car navigation system, makes determination, and further performs an operation, the driver has to pay necessary attention to these objects outside of the vehicle, and drive the vehicle avoiding these objects.

Accordingly, there is a need for a visual guidance system for a vehicle such as an automobile that reduces a burden imposed on the driver.

SUMMARY OF THE INVENTION

In order to reduce the burden imposed on the driver, it is an object of the present invention is a visual guidance system configured to timely present a visual guide for notifying a driving direction and objects outside of a vehicle on the basis of a steering input signal.

An aspect of the present invention provides a visual guidance system including: an image display to present an image overlaid on a windshield in front of a driver of a vehicle; a processor to output image information on a virtual line for visual guidance to the image display; and a steering input detector for detecting a steering input. The processor presents an attention attracting indication about an object outside of the vehicle in synchronization with the virtual line in such a manner that the virtual line extends from above the driver along a course of the vehicle seen within the windshield, and a pointing end of the virtual line is overlaid on a road surface on the course seen within the windshield. The processor also outputs image information for changing the attention attracting indication to be less conspicuous than the virtual line in accordance with a steering input signal given by the steering input detector.

Preferably, the processor outputs image information for presenting the attention attracting indication, within a display range of the image display, as a line connecting the object outside of the vehicle and the virtual line.

Preferably, the processor outputs image information for presenting the attention attracting indication in such a manner that it branches and extends from the virtual line to the object outside of the vehicle with the virtual line is being presented, and erasing the attention attracting indication in accordance with the steering input signal given by the steering input detector.

Preferably, the processor outputs image information for presenting the attention attracting indication in such a manner that the attention attracting indication extends from the virtual line to the object outside of the vehicle with the virtual line being presented, and presenting the attention attracting indication more lightly in accordance with the steering input signal given by the steering input detector.

Preferably, the image display is an image projector to project an image onto the windshield, and the processor outputs, to the image projector, image information for presenting the virtual line as seen by the driver such that it extends from an upper edge of the windshield to a road surface.

Preferably, the visual guidance system further includes: a camera to capture an image within a visual field range of the driver in front of the vehicle; and a road surface recognizer to recognize the road surface in front of the vehicle, on the basis of the image captured by the camera. The processor outputs image information in which the pointing end of the virtual line is overlaid on the road surface thus recognized.

Preferably, the camera is a stereo camera unit.

According to the visual guidance system of the present invention, a virtual line extending from above the driver to a road on the course that is seen in the windshield is presented in an overlaid manner on the windshield in front of the driver. Further, an attention attracting indication with regard to objects outside of the vehicle is displayed in synchronization with the virtual line.

Accordingly, the gaze of the driver is naturally guided from a road to a target of attention attraction, and the driver can directly see the attention attraction target with the gazed thus guided. The driver can immediately recognize the attention attraction target without associating the attention attracting indication and the attention attraction target and without identifying the attention attraction target concerning the indication on the basis of the association thereof. Further, when a steering input based on a steering operation is detected and it is determined that the driver performs an evasive operation against the attention attraction target by the steering operation, then the attention attracting indication is presented in a more inconspicuous manner, so that the indication on the windshield is simplified, which reduces the burden imposed on the driver.

BRIEF DESCRIPTION OF OF THE DRAWINGS

FIG. 3 is an entire flowchart illustrating the visual guidance system according to the example of the present invention;

FIG. 4 is a partial flowchart illustrating a visual guide presenting procedure in the visual guidance system according to the example of the present invention;

FIG. 5 is a flowchart concerning an attention attracting indication of the visual guide presenting procedure in the visual guidance system according to the example of the present invention;

DETAILED DESCRIPTION

An example of the present invention will be described with reference to the drawings.

Figure 1:
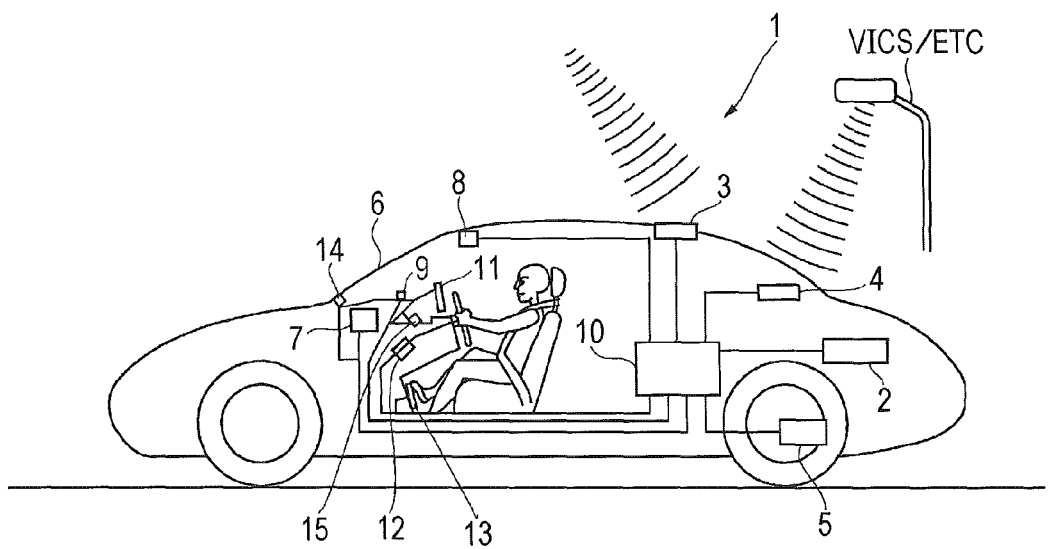
FIG. 1 is a figure illustrating an overview of a visual guidance system according to an example of the present invention.

FIG. 1 illustrates an example of the present invention. The visual guidance system of the present invention will be described with reference to FIG. 1

FIG. 1 is a figure illustrating an overview of the visual guidance system according to the example of the present invention. A visual guidance system 1 includes a map information database 2, a Global Positioning System (GPS) antenna 3, a windshield 6 installed in front of a driver, an (image projection unit 7 serving as the image display, and a processing unit 10 for outputting desired route information from GPS information obtained by the GPS antenna 3 and map information given by the map information database 2. Further, the visual guidance system 1 includes an antenna 4 for intelligent transportation system communication such as a Vehicle Information and Communication System (VICS) and an Electronic Toll Collection System (ETC), and obtains traffic information and makes payment at a toll road.

A vehicle speed sensor 5 is provided at a rear wheel of the vehicle to detect vehicle speed information, which is input to the processing unit 10. In the cabin, a stereo camera unit 8 including two cameras is provided to capture an image in front of and outside of the vehicle. The stereo camera unit 8 uses the parallax thereof to measure the distance to the road surface or an object in front of the vehicle. Further, in the cabin, provided are a gaze detection unit 9 for detecting the gaze of the driver, an operation unit 11 for setting a destination desired by the driver, a microphone 15 for setting the destination by voice, and an illuminance sensor 14 for detecting brightness.

The processing unit 10 also receives information from a steering input detection unit 12 for detecting a driver's steering operation and a braking input detection unit 13 for detecting a driver's braking operation. Further, a side camera 19 (see FIG. 2) is provided to detect and capture an image of the outside of the visual field range of the driver and the outside of the display range of the image display unit.

Figure 2:
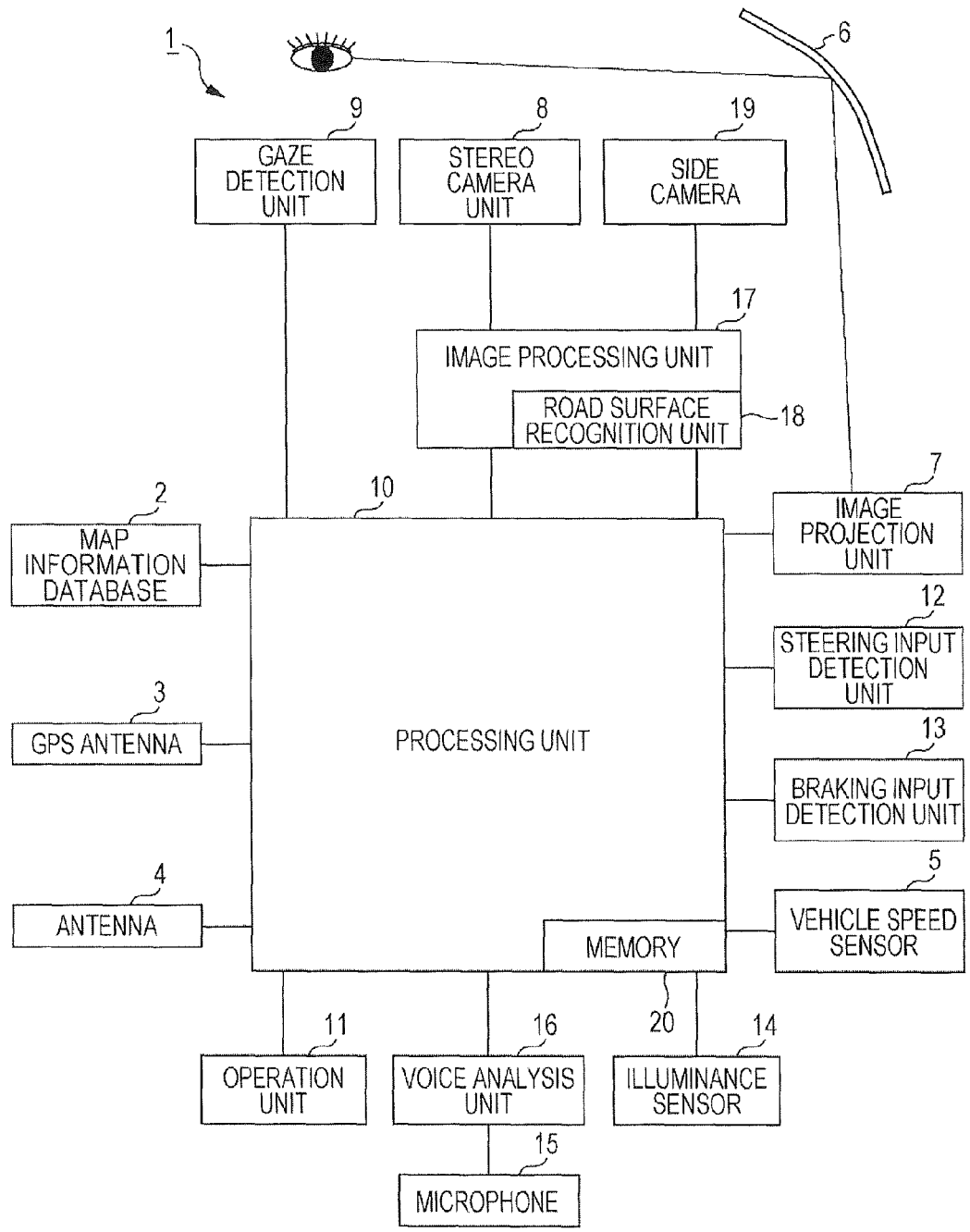
FIG. 2 is a block configuration diagram illustrating the visual guidance system according to the example of the present invention.

Next, the configuration members connected to the processing unit 10 will be described. FIG. 2 is a block configuration diagram illustrating the visual guidance system according to the example of the present invention. The processing unit 10 is connected with the map information database 2, the GPS antenna 3, the antenna 4, the vehicle speed sensor 5, the image projection unit 7, the stereo camera unit 8 and the side camera 19 via an image processing unit 17, the gaze detection unit 9, the operation unit 11, the steering input detection unit 12, the braking input detection unit 13, the illuminance sensor 14, and the microphone 15 via a voice analysis unit 16.

The processing unit 10 receives information from the vehicle speed sensor 5, the gaze detection unit 9, and the like to change the shape of a virtual line L the shape being to be presented on the windshield 6. The virtual line L according to the example serves as a course guiding line indicating the driving direction of the vehicle or a visual guide to a visual guidance target. The processing unit 10 also receives information from the operation unit 11 provided in the cabin, information from the steering input detection unit 12 which detects a steering operation by the driver, information from the braking input detection unit 13 which detects a braking operation by the driver, illuminance information around the windshield 6 measured by the illuminance sensor 14, and information from the microphone 15 (information obtained by audio analysis performed by the voice analysis unit 16).

The processing unit 10 also changes the shape of the virtual line L to be presented in accordance with the information from the steering input detection unit 12 which detects a steering operation by the driver and the information from the braking input detection unit 13 which detects a braking operation by the driver. Further, the processing unit 10 changes the density, the brightness, and the like of the virtual line L on the basis of illuminance information around the windshield 6 provided by the illuminance sensor 14, thereby the driver to easily see the virtual line L.

The gaze detection can be performed with an infrared camera that captures reflected light from the corneas. The gaze direction can also be determined by using an image sample. Specifically, the eyes and the face of a study subject looking in a predetermined direction are captured by a camera, and the resultant image is registered to a measuring system in advance. Then the angles of the face and the eyes of the driver are measured, and a summation of them both is calculated, so that the gaze direction can be identified.

In this case, the direction of the face is measured by detecting the positions of facial parts such as eyes and a nose and an overall head portion of a person in the image, and the direction of the eyes is measured by detecting the positions of irises and an overall region of the eyes in the image. Then, the relationship of these positions are applied to a model of eyeballs to measure an angle with respect to the direction in front of the face.

Next, the details will be described using a flowchart of the visual guidance system and a figure of an operation state of the visual guidance system including the state when the driver sees from the driver's seat. FIG. 3 is an entire flowchart illustrating the visual guidance system according to the example.

The driver designate the destination using the operation unit 11 provided in the cabin. The driver can designate the destination also by speaking the destination into the microphone 15 which detects the driver's voice, whereby the voice analysis unit 16 performs audio analysis (step ST10).

The processing unit 10 performs route processing in accordance with the designated destination (step ST11). In the route processing, the processing unit 10 obtains the position and the azimuth of the vehicle using the GPS information obtained by the GPS antenna 3 and the map information of the map information database 2, and calculates a desired route to the destination. The memory 20 stores the map information required for the route and the route guiding. When the position of the vehicle based on the GPS information is determined not to be on the route while driving, the route is calculated as necessary, and the information in the memory 20 is rewritten.

The image projection unit 7 displays, on the windshield 6, the virtual line L, road information, and the like which are processed on the basis of the route and the map information to the destination stored in the memory 20 of the processing unit 10 (step ST12). In this visual guide presenting procedure, the processing unit 10 also uses information about the road surface received from the stereo camera unit 8 and information about the distances to the road surface and to the object outside of the vehicle.

The image captured by the stereo camera unit 8 is processed by the image processing unit 17, and then, a road surface recognition unit 18 recognizes the road surface. In parallel, the image processing unit 17 analyzes the relative speed of and the distance from an object within a range captured by the stereo camera unit 8. Accordingly, the processing unit 10 uses not only the route and the map information but also information about the road surface and the distance to process information which is to be presented. The processing unit 10 changes the shape of the virtual line L to be presented in accordance with the vehicle speed, and transmits information to be presented on the windshield 6 to the image projection unit 7.

In the example, the image projection unit 7 is used as the image display, but a transparent organic EL sheet may be provided on the windshield, and the information may be directly presented on the sheet. In this case, the processing unit 10 outputs image information to the organic EL sheet.

a typical visual guide presenting procedure of the visual guidance system according to the example will be described with reference to a flowchart of FIG. 4. FIG. 4 is a flowchart illustrating the visual guide presenting procedure in the visual guidance system according to the example.

In the visual guide presenting procedure in step ST12, the road surface recognition unit 18 is captured by the stereo camera unit 8, and the road surface is recognized from the image processed by the image processing unit 17, and this information is transmitted to the processing unit 10. The road surface is recognized in this manner (step ST13).

Subsequently, the processing unit 10 outputs image information in which the pointing end of the virtual line L processed on the basis of the route and the map information to the destination stored in the memory 20 is overlaid on the road surface thus recognized (step ST14). The pointing end of the virtual line L seems to the driver as if it is touching the ground of the road surface.

As described above, in the windshield provided in front of the driver, the virtual line L is presented in an overlaid manner on the actual scenery and road, thereby reducing the burden imposed on the driver. By displaying it on the glass, the gaze can be guided without any auxiliary instruction such as voice and sound. This is because when there is a line, people have the habit of looking for an end thereof. Therefore, the driving direction can be guided naturally with the gaze during the cruising state, and the gaze of the driver can be guided so as to be suitable for the driving environment without causing the driving to be aware of it. Since the driving direction is presented with the line, the road environment is not largely hidden, thereby allowing the driver to see both of the course guiding line and the road environment at the same time.

Figure 6:
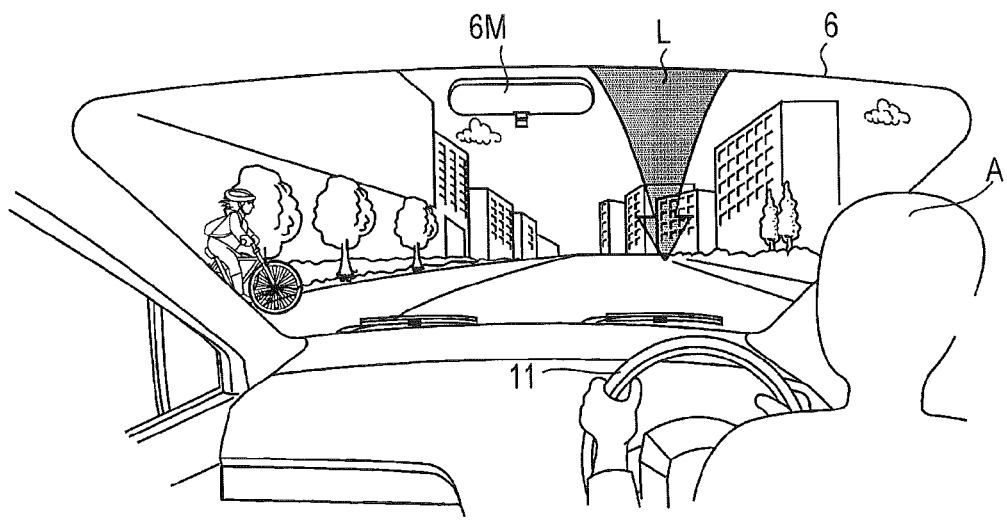
FIG. 6 is a figure illustrating an operation state including an example of a display on a windshield with the visual guidance system according to the example of the present invention.
Figure 7:
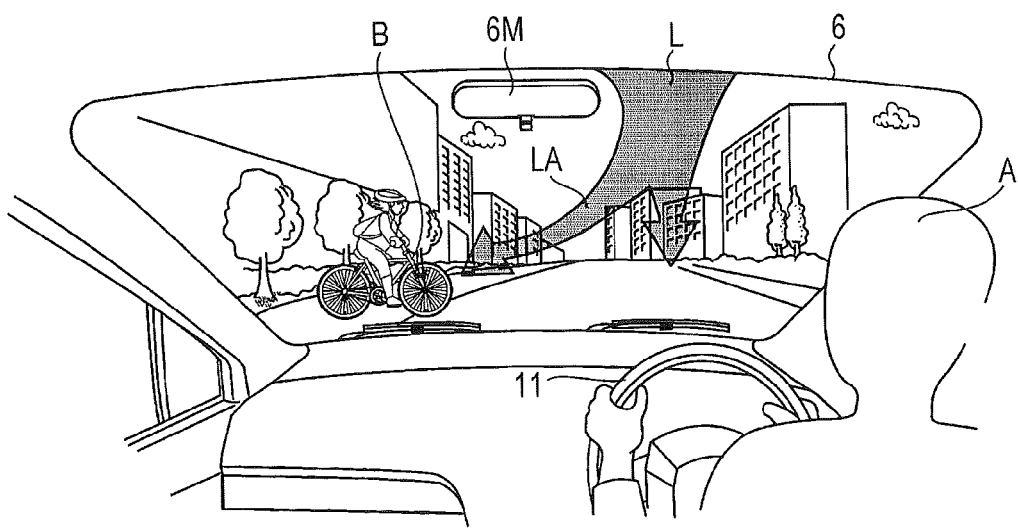
FIG. 7 is a figure illustrating an operation state including another example of a display on a windshield with the visual guidance system according to the example of the present invention.
Figure 8:
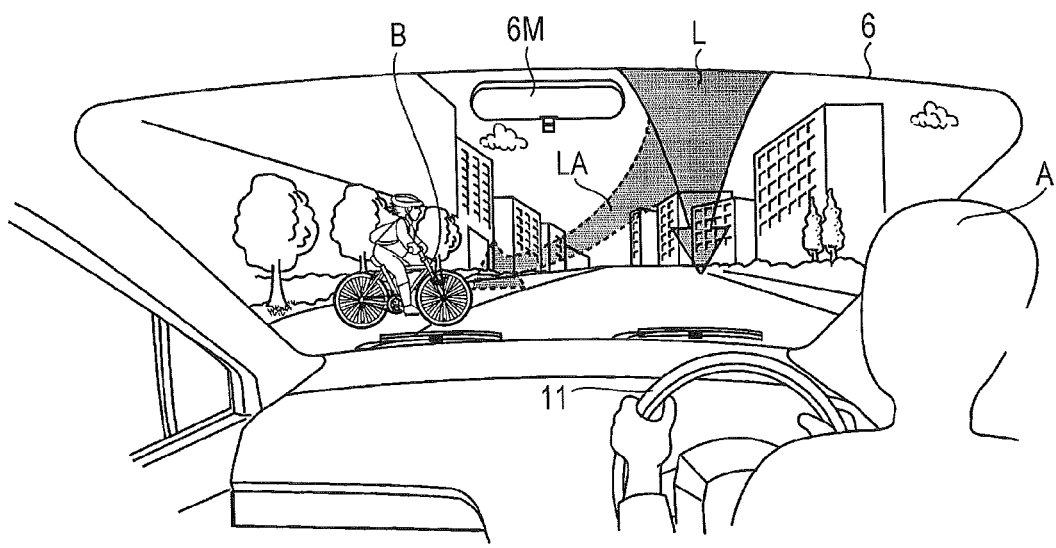
FIG. 8 is a figure illustrating an operation state including another example of a display on a windshield with the visual guidance system according to the example of the present invention.

Next, the visual guide presenting procedure of the visual guidance system will be described in detail with reference to FIGS. 5 and 6 to 8. FIG. 5 is a flowchart concerning an attention attracting indication LA of the visual guide presenting procedure in the visual guidance system according to the example of the present invention. The attention attracting indication LA is processed as a part of visual guidance indication. FIGS. 6 to 8 are figures illustrating operation state including examples of displays on a windshield with the visual guidance system according to the example of the present invention. In the figure of the operation state, a driver A is at a closer side, and in front of the driver A, there are the windshield 6 and a mirror 6M in the cabin. The driver A sees an real image outside of the vehicle with through the windshield 6.

Even if an object outside of the vehicle is not recognized or an object outside of the vehicle is recognized but it is not necessary to attract attention and thus no attention is presented, a virtual line L is displayed on the windshield in front of the driver A so that it is overlaid on the road surface in front of the vehicle as illustrated in FIG. 6.

The processing unit 10 recognizes an object outside of the vehicle from an image captured by the stereo camera unit 8 and processed by the image processing unit 17 (step ST15). When no object outside of the vehicle is recognized (NO in step ST15), step ST15 is repeated. When an object outside of the vehicle is recognized (YES in step ST15), a determination is made as to whether or not it is necessary to attract driver's attention to the object outside of the vehicle (step ST16).

When it is determined that it is not necessary to attract driver's attention to the recognized object outside of the vehicle (NO in step ST16), another object outside of the vehicle in the image captured by the stereo camera unit 8 and processed by the image processing unit 17 is recognized (the routine returns to step ST15 and step ST16).

When it is determined that it is necessary to attract driver's attention to the recognized object outside of the vehicle (YES in step ST16), the attention attracting indication LA is shown (step ST17). The processing unit 10 outputs image information for presenting the attention attracting indication LA with regard to the object outside of the vehicle in which the pointing end of the virtual line L is overlaid on the road surface on the course seen in the windshield and further in synchronization with the virtual line L. More specifically, the processing unit 10 outputs image information for showing the attention attracting indication LA as a line connecting the object outside of the vehicle and the virtual line L.

As illustrated in FIG. 7, while the virtual line L remains presented on the windshield 6 seen by the driver A, the attention attracting indication LA is presented. In FIG. 7, a bicycle B approaching the road on which the vehicle is running is recognized and determined to be an object outside of the vehicle to which it is necessary to attract driver's attention, and the attention attracting indication LA is shown as a line connecting the bicycle B and the virtual line L. While the virtual line L remains presented, the attention attracting indication LA is shown, in which a branch extends from the virtual line L to the bicycle B. This is achieved by causing the processing unit 10 to transmit, to the image projection unit 7, image information of a line (notification line) branching off and extending from the virtual line L with regard to the object outside of the vehicle (bicycle B) processed and recognized by the image processing unit 17.

Subsequently, the steering input detection unit 12 detects a steering operation (steering input) of the driver A, and transmits a steering input signal to the processing unit 10. The processing unit 10 determines, from image information given by the image processing unit 17 and the steering input signal, whether the driver A has recognized the object outside of the vehicle (bicycle B) and steered around the object (step ST18). When the driver A has not steered around the object outside of the vehicle (bicycle B) (NO in step ST18), the attention attracting indication LA is continuously shown (step ST17). At this occasion, the attention attracting indication LA may be presented in an emphasized manner.

When the driver A steered around the object outside of the vehicle (bicycle B) (YES in step ST18), the attention attracting indication LA is changed so that it is less conspicuous than the virtual line L (step ST19). FIG. 8 indicates that the driver A steered around the object outside of the vehicle (bicycle B) by steering operation and thereafter the edges of the attention attracting indication LA is presented as a broken line.

Figure 9:
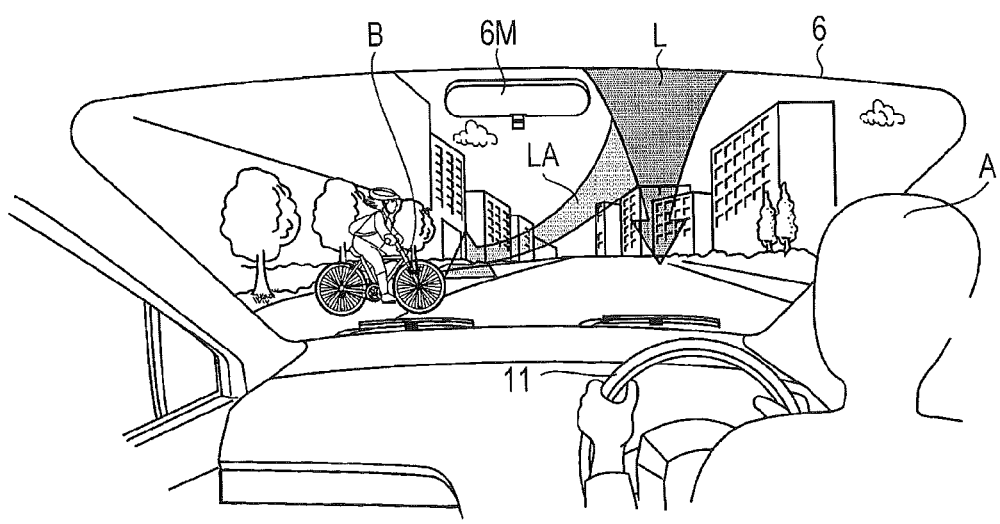
FIG. 9 is a figure illustrating an operation state including another example of a display on a windshield with the visual guidance system according to the example of the present invention.
Figure 10:
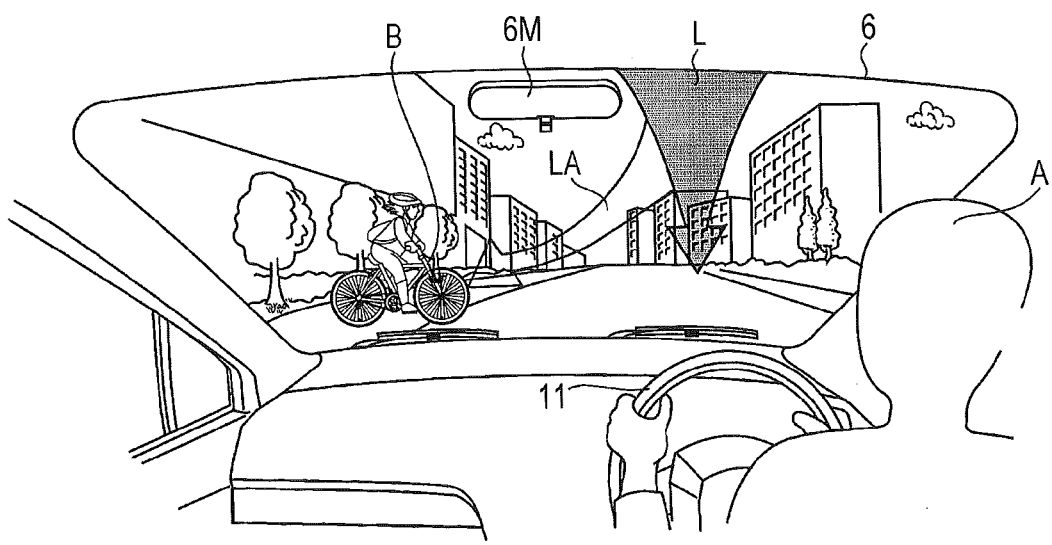
FIG. 10 is a figure illustrating an operation state including another example of a display on a windshield with the visual guidance system according to the example of the present invention.
Figure 11:
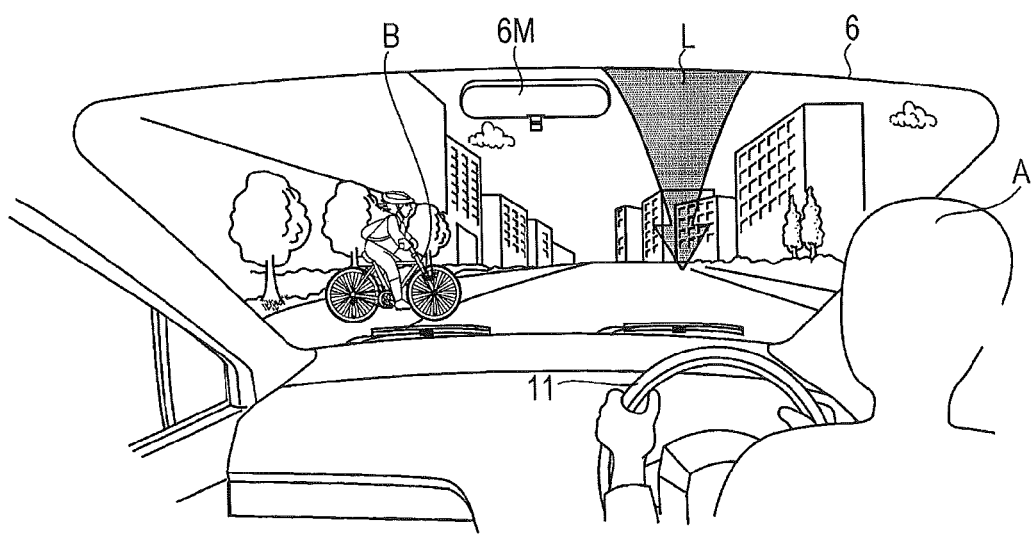
FIG. 11 is a figure illustrating an operation state including another example of a display on a windshield with the visual guidance system according to the example of the present invention.

Another example of an attention attracting indication LA according to steering input of the example will be described. FIGS. 9 to 11 illustrate an operation state including examples of a display on a windshield with the visual guidance system according to the example. FIG. 9 indicates that the attention attracting indication LA is presented more lightly than the virtual line L so that the attention attracting indication LA is presented less conspicuously than the virtual line L after the driver A steered around the object outside of the vehicle (bicycle B) by a steering operation.

FIG. 10 indicates that the attention attracting indication LA is presented with a white outline arrow so that the attention attracting indication LA is presented less conspicuously than the virtual line L after the driver A steered around the object outside of the vehicle (bicycle B) by steering operation.

FIG. 11 indicates that the attention attracting indication LA is erased and only the virtual line L is presented so that the attention attracting indication LA is displayed less conspicuously than the virtual line L after the driver A steered around the object outside of the vehicle (bicycle B) by steering operation.

In the above example, the virtual line and the attention attracting indication LA are described using examples of shapes, but the example is not limited thereto. They may be presented using thickness and color of the line, a broken line, an alternate long and short dashed line, and the like, or the virtual line L may be changed in real time in accordance with information on the gaze situation and information about the surroundings of the vehicle and driving environment. The shape, color, and the like of only the end portion to which the driver pays attention may be changed in accordance with information.

As described above, the processing unit 10 outputs, to the image projection unit, image information for changing the presentation of the virtual line L in accordance with the vehicle speed given by the vehicle speed sensor 5, so that the virtual line L as seen by the driver A extends from the upper edge of the windshield 6 to the road surface, and in accordance with the detection information from the gaze detection unit 9, the attention attracting indication LA is changed. As a result, natural visual guidance can be given to the driver A, which reduces the burden imposed on the driver.

As described above, a determination may be made as to whether to display or hide the virtual line L and the attention attracting indication LA and as to the shape of display thereof, in accordance with not only the display processing based on the gaze detection information but also information on the driving environment based on steering, braking, and traction and information on the surroundings of the vehicle based on images captured by the stereo camera unit 8. Taking the driving environment as an example, when the vehicle runs on an frozen road on which tires are likely to slip, it is safer to put the gaze at a distant position even if the vehicle speed is not high, and therefore, the pointing end of the virtual line L is presented so that the gaze is guided to a farther position than a normal position. On a mountainous road at night, the end portion of the virtual line L is put on the end of a corner and a start point of a subsequent corner, which prevents drifting away from the driving lane and prevents the vehicle body from spinning.

<Configuration and Effects of the Example>

A visual guidance system according to the example includes the image display to display an image overlaid on a windshield in front of a driver of a vehicle, the processor to output image information about a virtual line for presenting visual guidance to the image display; and the steering input detector to detect steering input. The processor presents an attention attracting indication about an object outside of the vehicle in synchronization with the virtual line in such a manner that the virtual line extends from above the driver along a course of the vehicle seen within the windshield, and a pointing end of the virtual line is overlaid on a road surface on the course seen within the windshield, and the processor outputs image information for changing the attention attracting indication to be less conspicuous than the virtual line in accordance with a steering input signal given by the steering input detection unit.

With the configuration as described above, the center of the visual field of the driver is guided to a road surface on the course seen within the windshield, and the driver can naturally recognize the course. Further, the center of the visual field of the driver is guided to an object outside of the vehicle which is seen within the windshield and to which the driver has to pay attention, and thus natural visual guidance can be achieved. Moreover, an evasive operation by a steering operation of the driver is detected, and the attention attracting indication is presented in a more inconspicuous manner, so that the indication on the windshield is simplified, which reduces the burden imposed on the driver. The attention attracting indication is changed according to steering, so that the indication after the evasive operation is less conspicuous, and the indication can be controlled with appropriate timing.

In the visual guidance system according to the example, the processor outputs image information for presenting the attention attracting indication as a line connecting the object outside of the vehicle and the virtual line within a display range of the image display.

With the configuration as described above, the gaze of the driver is guided along the line connecting the object outside of the vehicle and the virtual line, and natural visual guidance can be achieved. Therefore, the burden imposed on the driver can be reduced.

In the visual guidance system according to the example, the processor outputs image information for presenting the attention attracting indication in such a manner that it branches and extends from the virtual line to the object outside of the vehicle while the virtual line is displayed and erasing the attention attracting indication in accordance with the steering input signal given by the steering input detector.

With the configuration as described above, natural visual guidance can be achieved in such a manner that the gaze of the driver is guided from the course based on the virtual line to the object outside of the vehicle to which it is necessary to pay attention, and further, the evasion by an steering operation of the driver is detected, and the attention attracting indication is erased, so that the indication on the windshield is simplified, which reduces the burden imposed on the driver.

In the visual guidance system according to the example, the processor outputs image information for presenting the attention attracting indication in such a manner that it extends from the virtual line to the object outside of the vehicle while the virtual line is displayed, and displaying the attention attracting indication more lightly in accordance with the steering input signal given by the steering input detector.

With the configuration as described above, the gaze of the driver is appropriately guided to the object outside of the vehicle to which it is necessary to pay attention, and further, the evasion by an steering operation of the driver is detected, and the attention attracting indication is displayed lightly to make it less conspicuous, so that the indication on the windshield is simplified, which reduces the burden imposed on the driver in seeing the attention attraction object.

In the visual guidance system according to the example, the image display is an image projection unit to project the image onto the windshield, and the processing unit outputs, to the image projection unit, image information for presenting the virtual line as seen by the driver such that it extends from an upper edge of the windshield to a road surface.

With the configuration as described above, the center of the visual field of the driver can be naturally guided.

The visual guidance system according to the example includes the camera to capture an image within a visual field range of the driver in front of the vehicle, and the road surface recognizer to recognize the road surface in front of the vehicle, on the basis of the image captured by the camera. The processor outputs image information in which a pointing end of the virtual line is overlaid on the road surface thus recognized.

With the configuration as described above, the center of the visual field of the driver can be accurately guided to the road surface, and more natural visual guidance can be achieved.

In the visual guidance system according to the example, the camera is a stereo camera unit.

With the configuration as described above, the distance to the road surface and a preceding vehicle can be recognized more accurately, and display control can be performed in accordance with this information.

<Definitions and the Like>

The image display of the present invention is a transparent organic EL sheet and the like that shows an indication based on image information given by the processor and the image projection unit to project the image onto the windshield.

The virtual line of the present invention is a visible image such as a line and a dot presented or projected on the windshield such as front windshield, the rear window, and the side windows. The virtual line may be any indication as far as it is an indication capable of guiding the gaze of the driver.

The invention claimed is:

1. A visual guidance system comprising:
an image display to present an overlaid on a windshield in front of a driver of a vehicle;
a processor to output image information on a virtual line for displaying visual guidance to the image display; and
a steering input detector to detect a steering input, wherein
the processor presents an attention attracting indication about an object outside of the vehicle in synchronization with the virtual line in such a manner that the virtual line extends from above the driver along a course of the vehicle seen within the windshield, and a pointing end of the virtual line is overlaid on a road surface on the course seen within the windshield; and
the processor outputs image information for changing the attention attracting indication to be less conspicuous than the virtual line in accordance with a steering input signal given by the steering input detector.

2. The visual guidance system according to claim 1, wherein the processor outputs the image information for presenting the attention attracting indication, within a display range of the image display, as a line connecting the object outside of the vehicle and the virtual line.

3. The visual guidance system according to claim 1, wherein the processor outputs image information for presenting the attention attracting indication in such a manner that it branches and extends from the virtual line to the object outside of the vehicle with the virtual line being presented, and erasing the attention attracting indication in accordance with the steering input signal given by the steering input detector.

4. The visual guidance system according to claim 2, wherein the processor outputs image information for presenting the attention attracting indication in such a manner that it branches and extends from the virtual line to the object outside of the vehicle with the virtual line being presented, and erasing the attention attracting indication in accordance with the steering input signal given by the steering input detector.

5. The visual guidance system according to claim 1, wherein the processor outputs image information for presenting the attention attracting indication in such a manner that it extends from the virtual line to the object outside of the vehicle with the virtual line being presented, and presenting the attention attracting indication more lightly in accordance with the steering input signal given by the steering input detector.

6. The visual guidance system according to claim 2, wherein the processor outputs image information for presenting the attention attracting indication in such a manner that it extends from the virtual line to the object outside of the vehicle with the virtual line being presented, and presenting the attention attracting indication more lightly in accordance with the steering input signal given by the steering input detector.

7. The visual guidance system according to claim 1, wherein
the image display is an image projector to project an image onto the windshield, and the processor outputs, to the image projector, image information for presenting the virtual line as seen by the driver such that it extends from an upper edge of the windshield to a road surface.

8. The visual guidance system according to claim 2, wherein
- the image display is an image projector to project an image onto the windshield, and the processor outputs, to the image projector, image information for presenting the virtual line as seen by the driver such that it extends from an upper edge of the windshield to a road surface.

9. The visual guidance system according to a claim 1, further comprising:
- a camera to capture an image within a visual field range of the driver in front of the vehicle; and
- a road surface recognizer to recognize the road surface in front of the vehicle, on the basis of the image captured by the camera,
- wherein the processor outputs image information in which the pointing end of the virtual line is overlaid on the road surface thus recognized.

10. The visual guidance system according to a claim 2, further comprising:
- a camera to capture an image within a visual field range of the driver in front of the vehicle; and
- a road surface recognizer to recognize the road surface in front of the vehicle, on the basis of the image captured by the camera,
- wherein the processor outputs image information in which the pointing end of the virtual line is overlaid on the road surface thus recognized.

11. The visual guidance system according to claim 9, wherein the camera is a stereo camera unit.

12. The visual guidance system according to claim 10, wherein the camera is a stereo camera unit.

* * * * *